Jan. 26, 1965

C. F. ERNST 3,167,329

CLIP BOARD

Filed Feb. 4, 1963

INVENTOR.
CLIFFORD F. ERNST
BY
Malcolm W. Fraser
ATTORNEY

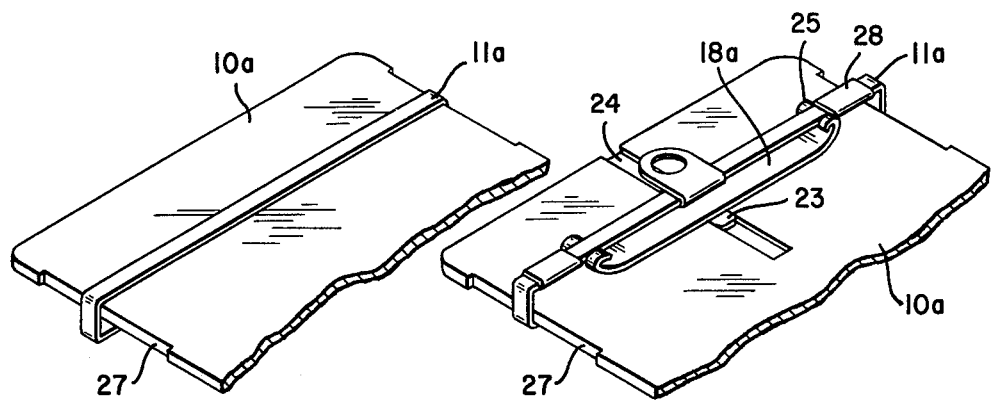
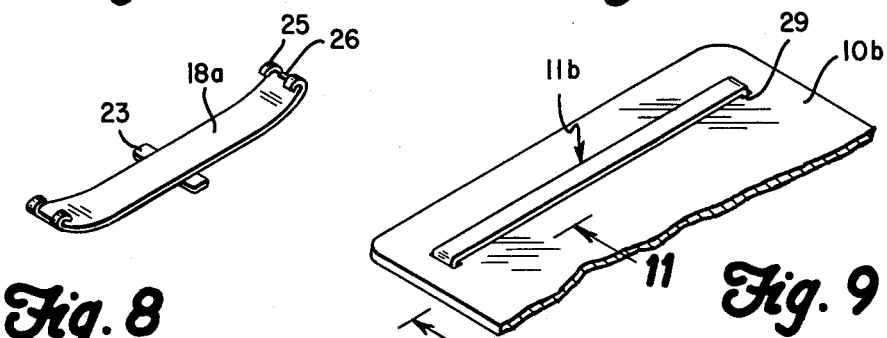
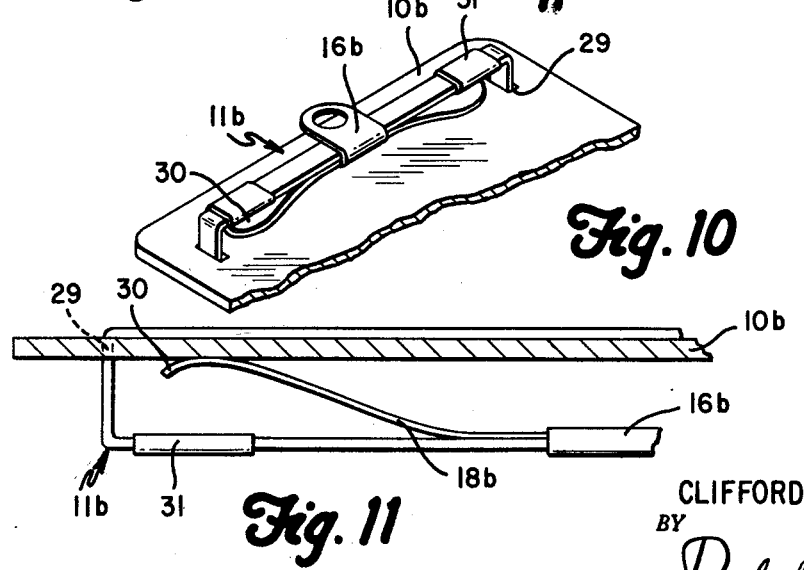
INVENTOR.
CLIFFORD F. ERNST

Jan. 26, 1965     C. F. ERNST     3,167,329
CLIP BOARD

Filed Feb. 4, 1963     3 Sheets-Sheet 3

INVENTOR.
CLIFFORD F. ERNST
BY
Malcolm W. Fraser
ATTORNEY

United States Patent Office 3,167,329
Patented Jan. 26, 1965

3,167,329
CLIP BOARD
Clifford F. Ernst, 301 Cedarbrook Lane, Sandusky, Ohio
Filed Feb. 4, 1963, Ser. No. 256,084
2 Claims. (Cl. 281—44)

This invention relates to clipboards provided with a relatively stiff panel to which papers, forms, maps or the like are releasably clamped and an object is to produce a new and improved clipboard having novel features of construction, operation and assembly which not only greatly enhance its usefulness, but also facilitates its operation to remove or apply one or more sheets.

This application is a continuation-in-part of application 56,307 filed September 15, 1960, and now abandoned.

Other objects and advantages of the invention will hereinafter appear, and for purposes of illustration, but not of limitation, embodiments of the invention are shown on the accompanying drawings in which FIGURE 1 is a top perspective view of a clipboard embodying my invention;

FIGURE 6 is a fragmentary top perspective view of an alternate form of the invention in which the sheet-engaging loop is longitudinally adjustable along the clipboard;

FIGURE 7 is a fragmentary bottom plan view of the form of the invention shown in FIGURE 6;

FIGURE 8 is a perspective view of the spring device employed in the form shown in FIGURES 6 and 7;

FIGURE 9 is a fragmentary top perspective view of another form of the invention in which the loop member is mounted in slots in the clipboard;

FIGURE 10 is a fragmentary bottom perspective view of the form shown in FIGURE 9;

FIGURE 11 is an enlarged fragmentary sectional view substantially on the line 11—11 of FIGURE 9;

Figure 1:
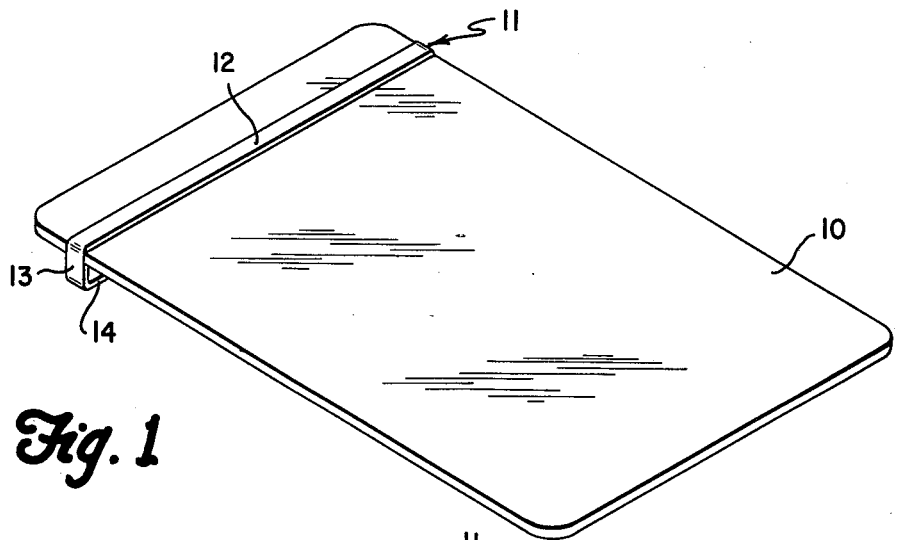
Figure 2:
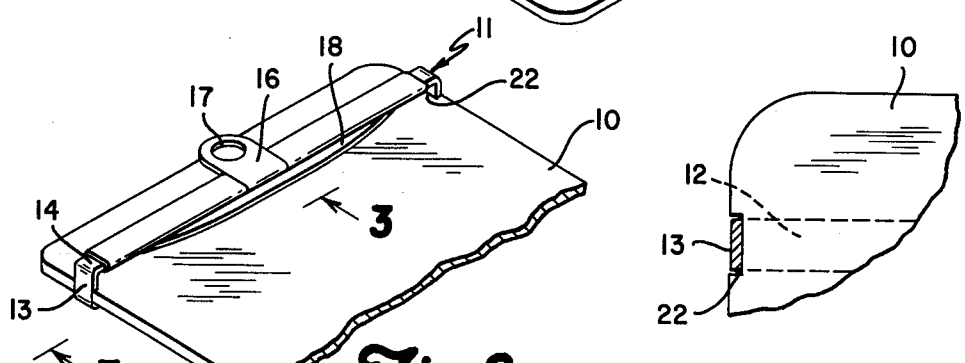
FIGURE 2 is a fragmentary bottom plan view of the clipboard shown in FIGURE 1.
Figure 4:
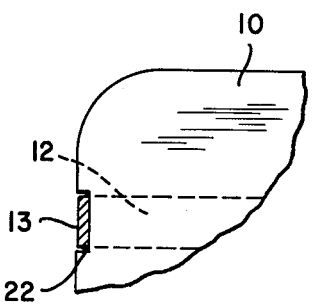
FIGURE 4 is a fragmentary sectional view substantially on the line 4—4 of FIGURE 3.
Figure 3:
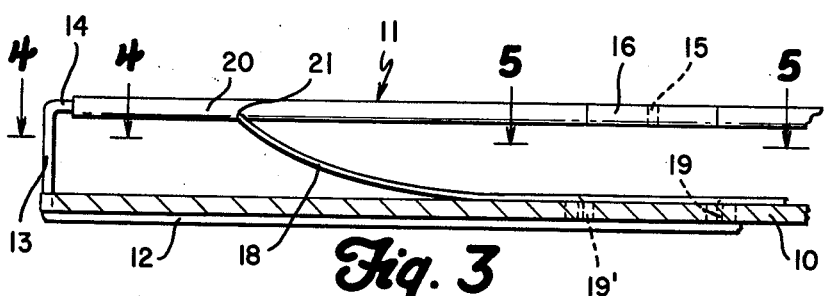
FIGURE 3 is an enlarged fragmentary sectional view substantially on the line 3—3 of FIGURE 2.
Figure 5:
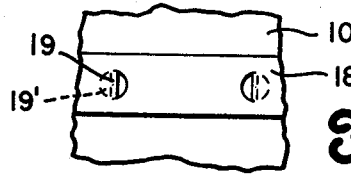
FIGURE 5 is a fragmentary view substantially on the line 5—5 of FIGURE 3.
Figure 12:
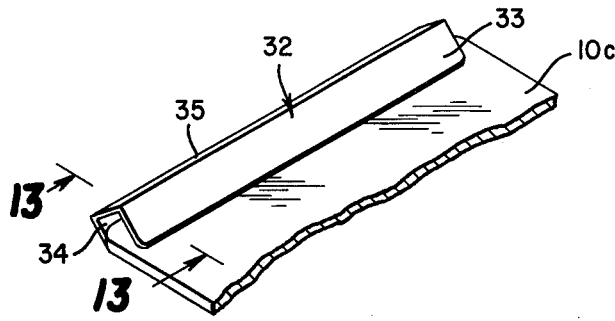
FIGURE 12 is a fragmentary top perspective view of a still further form of the invention embodying an elongate U-shaped clip member.

The illustrated embodiment of the invention shown on FIGURES 1 to 5 comprises a clipboard 10 which is rectangular in shape and is of a stiff and rigid fibrous material, smooth on both sides. For clamping sheets to the clipboard is an elongate rectangular flat loop member 11 formed of relatively narrow, rigid strap metal. The loop member has an upper elongate arm 12 and integral therewith at the ends of the arm 12 and extending at right angles thereto are side arms 13 with which elongate underarms 14 are integral. The arms 14 and 12 are parallel to each other, the loop member being formed of a single length of strap metal bent to this position, the ends being in abutting relation or slightly spaced from each other as indicated at 15 on FIGURE 3. The free ends of the arms 14 are rigidly secured together by a metallic clip 16 embracing these end portions and welded thereto, the clip member having a hole 17 to enable the clipboard to be hung on a nail or a hook.

Attached to the underside of the clipboard is an outwardly bowed leaf spring 18, the base of which has downturned lips 19 projecting into holes 19' in the clipboard. The free ends of the spring engage the arms 14 and extend loosely into slots 21 formed in a wrapping 20 or of suitable material which is wound around the arms 14. This enables the ends of the spring 18 to slide into and out of the slots 21 when the underarms 14 are pressed in a direction toward the clipboard, thereby to raise the upper arm 12 above the upper surface of the clipboard for sheet releasing and other purposes.

For retaining the loop member 11 in the proper position on the clipboard, a pair of notches 22 are formed in opposite edges of the board and into these notches fit the side arms 13. In this manner the loop member is at all times retained in the desired position and canting of the loop relative to the board is prevented.

FIGURES 6 to 8 illustrate an alternate form in which the clipboard 10a is provided with a similar flat rectangular loop member 11a. On the underside of the clipboard is a leaf spring 18a and welded to the base of the leaf spring and disposed at right angles thereto is a relatively narrow guide strip 23 which is adapted to ride in a longitudinally elongate shallow groove 24 formed in the underside of the clipboard 10a. At the free ends of the leaf spring 18a are spring extensions 25, each end of the spring being provided with a pair of inwardly curled extensions 25 which are spaced from each other to provide a notch 26 therebetween of approximately the width of the loop arms, as shown on FIGURE 7, so that the spring can ride along the underarms of the loop. In view of the notches 26, movement of the loop along the clipboard positively shifts the spring accordingly. The guide 23 which projects from opposite sides of the base of the spring holds the spring and the loop member 11a from being canted. On opposite side edges of the clipboard 10a are longitudinally elongate notches 27, which define the extent of longitudinal adjustment of the loop member 11a.

On the outer side of each of the curled spring extensions 25 and wrapped about the respective underarms of the loop member is a wrapping 28 of any suitable material to provide a stop for limiting the outward sliding movement of the spring ends as will be readily understood.

FIGURES 9 to 11 illustrate a still further form of the invention in which the clipboard 10b is provided with a similar flat rectangular clamping loop 11b. In this instance a pair of slots 29 are formed in the clipboard and into these slots extend the side arms of the loop member. In this manner the clamping loop is retained in one position and any liability of its becoming canted or displaced is obviated.

In this form of the invention, the bowed leaf spring 18b has its base secured to the underarms of the loop member by a welded-on clip 16b, so that the clip 16b not only holds the bowed leaf spring 18b in position but also clamps the free ends of the underarms of the loop member. In this form the free ends of the leaf spring are outwardly curved in a direction away from the clipboard so as to ride freely aling the clipboard in operation. On the underarms of the loop member are bearing pads 31 against which the spring ends may abut when the spring is fully depressed.

The form of the invention shown on FIGURES 12 to 16 comprises a clipboard 10c and fitting over the upper end of the clipboard is an elongated U-shaped rigid metallic clip member 32, which in this instance is slightly shorter than the width of the clipboard. The clip member 32 has an upper arm 33 and a lower parallel arm 34, the arms being connected by an integral web 35. Connected to the inside, as by welding, and disposed centrally thereof, is a relatively short spacer panel 36 which is of generally inverted L-shape.

Rigid with the lower arm 34 of the clip member and adjacent opposite ends thereof is a pair of rigid posts 37 which terminate short of the upper arm 33 of the clip member. The posts 37 extend through longitudinally elongate holes 38 spaced from the outer edge of the clipboard.

Figure 13:
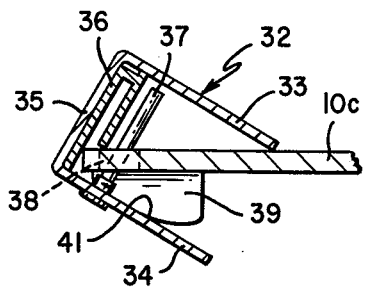
FIGURE 13 is an enlarged sectional view substantially on the line 13—13 of FIGURE 12.
Figure 15:
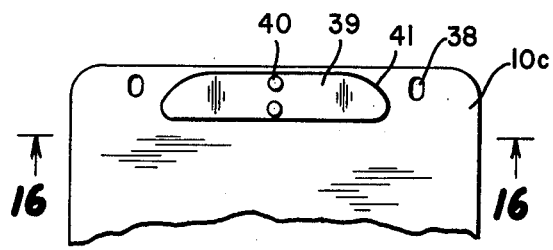
FIGURE 15 is a fragmentary top plan view of the clipboard shown in FIGURES 12 to 14, but with the U-shaped clip member and associated parts removed.

It will be seen that the clip member 32 can rock about the posts 37 with the free end beneath the spacer panel 36, and to urge the parts into the position as shown in FIGURE 13 in which the upper arm 33 engages at its free end against the clipboard, a bowed leaf spring 39 has its base connected by rivets 40 to the clipboard. The inner free end portions of the spring 39 are arcuately curved as indicated at 41 to abut against the lower arm 34 of the clip member to urge it to the position shown in FIGURE 13.

Figure 14:
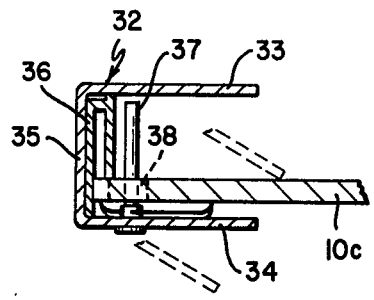
FIGURE 14 is a sectional view similar to FIGURE 13, but showing the U-shaped clip member rocked to a sheet releasing position.
Figure 16:
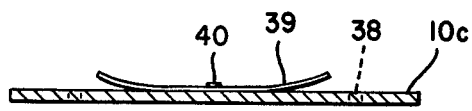
FIGURE 16 is a transverse sectional view substantially on the line 16—16 of FIGURE 15.

Manifestly by rocking the clip member 32 to the position shown in FIGURE 13, space is afforded for inserting sheets on the clipboard and upon releasing the clip member 32, it immediately returns to the broken line position shown in FIGURE 14, thereby clamping such sheets firmly against the upper surface of the clipboard.

Numerous changes in details of construction, arrangement and choice of materials may be effected without departing from the spirit of the invention, especially as defined in the appended claims.

What I claim is:

1. A clip board comprising a flat panel, a strap loop of substantially rigid material having a pair of relatively long arms, one first arm extending across the face of the panel and the other arm extending across the base of the panel, there being relatively short arms connecting the long arms and disposed along the side edges respectively of the panel, longitudinally elongate notches in opposite side edges of the panel respectively to receive the short arms of the loop, a leaf spring of bowed form having its intermediate portion disposed on the base of the panel and its end engaging the said other long arm of the loop for urging such arm away from the panel to cause the first arm yieldingly to grip the face of the panel, and means including a groove in the panel and a spring-carried member riding in the groove to accommodate shifting of the loop and leaf spring to an extent determined by the length of said notches.

2. A clip board comprising:
   a flat panel;
   a strap loop having a pair of relatively long arms, one first arm extending across the front surface of said panel and the other arm extending across the back surface of said panel, there being relatively short arms connecting the long arms and disposed along the side edges respectively of the panel, the said other arm and the said short arms of said loop being substantially rigid with respect to one another;
   notches in opposite side edges of said panel respectively to receive the short arms of said loop; and
   a leaf spring of bowed form having the intermediate portion thereof secured to the back surface of said panel and the opposite end portions thereof engaging the said other arm of said loop for urging such arm away from the back surface of said panel to cause the said first arm yieldingly to grip the front surface of said panel.

References Cited in the file of this patent

UNITED STATES PATENTS

| 2,242,737 | Alfreds | May 20, 1941 |
| 2,500,468 | Postell | Mar. 14, 1950 |
| 2,573,157 | Miller | Oct. 30, 1951 |
| 2,740,645 | Anderson | Apr. 3, 1956 |

FOREIGN PATENTS

| 449,823 | Great Britain | July 6, 1936 |